United States Patent [19]

Gilbert

[11] Patent Number: 4,490,463
[45] Date of Patent: Dec. 25, 1984

[54] ALKANEDIYL BRIDGED BENZIMIDAZOLO MONOMETHINE CYANINE DYES, PROCESSES FOR THEIR PREPARATION, AND PHOTOGRAPHIC EMULSIONS AND ELEMENTS CONTAINING SUCH DYES

[75] Inventor: David P. Gilbert, Webster, N.Y.

[73] Assignee: Eastman Kodak Company, Rochester, N.Y.

[21] Appl. No.: 471,615

[22] Filed: Mar. 3, 1983

[51] Int. Cl.$^3$ ................................................ G03C 1/02
[52] U.S. Cl. .................................... 430/581; 430/570; 430/583
[58] Field of Search ............... 430/578, 581, 583, 570, 430/505, 579

[56] References Cited

U.S. PATENT DOCUMENTS

| | | |
|---|---|---|
| 2,479,152 | 8/1949 | Brooker . |
| 2,541,400 | 2/1951 | Brooker et al. ..................... 430/570 |
| 3,337,578 | 8/1967 | Bader et al. . |
| 3,622,317 | 11/1971 | Bird et al. ........................... 430/581 |
| 3,904,637 | 9/1975 | Lincoln et al. ..................... 430/570 |

FOREIGN PATENT DOCUMENTS 1096104 12/1967 United Kingdom .

Primary Examiner—J. Travis Brown
Attorney, Agent, or Firm—Carl O. Thomas

[57] ABSTRACT

Alkanediyl bridged benzimidazolo monomethine cyanine dyes are disclosed wherein at least one benzimidazolo nucleus is provided with an electron-withdrawing group. A disclosed preparation of the dyes includes producing an electron-withdrawing group substituted bis(2-nitrophenyl)-2-$R^1$-propanediamide, where $R^1$ is hydrogen or alkyl; converting the nitro groups to primary amine substituents; removing the elements of water to effect ring closure; and thereafter providing the -$CR^1$- linked benzimidazole nuclei so formed with an N,N'-alkanediyl bridging group and quaternizing substituents. Dye synthesis is completed by reducing the -$CR^1$- linking group to the corresponding methine. The dyes are useful as sensitizers in silver halide emulsions and photographic elements.

11 Claims, No Drawings

ALKANEDIYL BRIDGED BENZIMIDAZOLO MONOMETHINE CYANINE DYES, PROCESSES FOR THEIR PREPARATION, AND PHOTOGRAPHIC EMULSIONS AND ELEMENTS CONTAINING SUCH DYES

FIELD OF THE INVENTION

This invention is directed toward novel alkanediyl bridged benzimidazolo cyanine dyes, processes for their preparation, and silver halide emulsions and photographic elements incorporating such dyes.

BACKGROUND OF THE INVENTION

Since the light absorption of cyanine dyes shifts bathochromically as the dye chromophore is lengthened, monomethine cyanine dyes, characterized by a single methine linking the dye nuclei, are particularly useful in absorbing blue light. Benzimidazolo monomethine cyanine dyes, precursors thereof, and methods for their preparation are known in the art, as illustrated by Ferrania U.K. Patent No. 1,096,104 and Bader et al U.S. Pat. No. 3,337,578. When benzimidazolo cyanine dyes are employed as sensitizers in silver halide emulsions, it is known that the presence of one or more electron-withdrawing groups reduces the basicity of the dyes and increases their sensitizing efficiency. It is also known that the relative orientation of dye nuclei can affect the manner and efficiency with which they are adsorbed to silver halide grain surfaces and therefore significantly influence their sensitizing characteristics.

One technique that can be employed for orienting benzimidazolo monomethine cyanine dye nuclei is to employ an alkanediyl (alkylene) group bridging the benzimidazolo nuclei. Brooker U.S. Pat. No. 2,479,152 discloses 1,1'-dialkyl-3,3'-alkylene-benzimidazolo monomethine cyanine dyes and a process for their synthesis. Unfortunately the synthetic process taught by Brooker will not produce alkanediyl bridged benzimidazolo monomethine cyanine dyes including commonly employed electron-withdrawing substituents on the benzimidazolo nuclei. Thus, although alkanediyl bridging is capable of relatively orienting the nuclei for efficient adsorption to silver halide grain surfaces, the sensitizing action of the dyes is not as highly efficient because of their high basicity, as compared to the preferred, electron-withdrawing group substituted benzimidazolo cyanine dyes employed as spectral sensitizers. Further, the synthetic process of Brooker effectively restricts the quaternizing 1,1' substituents to alkyl. (Although Brooker assigns quaternizing alkyl substituents 1,1' ring designations and the alkanediyl bridging group 3,3' ring designations, it should be noted that these ring position designations are reversed when the alkanediyl bridging group precedes the quaternizing substituent in alphabetical order.)

SUMMARY OF THE INVENTION

In one aspect the invention is directed to N,N'-alkanediyl bridged benzimidazolo monomethine cyanine dyes wherein at least one of the benzimidazolo nuclei is substituted with an electron-withdrawing group.

In another aspect the invention is directed to a radiation-sensitive emulsion comprised of a dispersing medium, silver halide grains, and a sensitizing amount of a cyanine dye as described in the preceding paragraph.

In still another aspect the invention is directed to a photographic element comprised of a support and, coated on the support, a radiation-sensitive emulsion as described in the preceding paragraph.

In an additional aspect the invention is directed to a method of preparing an N,N'-alkanediyl bridged benzimidazolo monomethine cyanine dye comprising producing an electron-withdrawing group substituted bis(2-nitrophenyl)-2-$R^1$-propanediamide where $R'$ is hydrogen or alkyl of from 1 to 4 carbon atoms and is free of substituents in the $\alpha$ and $\beta$ positions; converting the nitro groups to primary amine groups; dehydrating to an electron-withdrawing group substitute, -$CR^1$- linked 2,2'-benzimidazole; providing an N,N'-alkanediyl bridging group and quaternizing substituents, and reducing the -CR'- linking group to the corresponding monomethine.

The present invention provides novel blue absorbing dyes. These dyes by reason of alkanediyl bridging groups effecting relative orientation of the benzimidazolo nuclei and by reason of incorporating electron-withdrawing groups to reduce basicity constitute a distinct improvement over alkanediyl (alkylene) bridged benzimidazolo monomethine cyanine dyes heretofore known in the art to be useful as blue sensitizers in silver halide emulsions. The invention offers further advantage over the prior state of the art in permitting the incorporation of quaternizing ring substituents which facilitate the introduction of the dyes in hydrophilic media, such as gelatino-silver halide emulsions. The invention further offers a novel approach to synthesizing alkanediyl-bridged benzimidazolo monomethine cyanine dyes that overcomes the substituent limitations of prior art syntheses. The invention still further offers novel and advantageous radiation-sensitive emulsions incorporating the alkanediyl bridged electron-withdrawing group substituted benzimidazolo monomethine cyanine dyes of this invention as well as novel and advantageous photographic elements incorporating these emulsions.

DESCRIPTION OF PREFERRED EMBODIMENTS

This invention is directed to alkanediyl bridged benzimidazolo monomethine cyanine dyes wherein at least one of the benzimidazolo nuclei is substituted with an electron-withdrawing group. Such dyes absorb blue light and are generally useful in conventional applications for cyanine dyes exhibiting this capability. The dyes are useful in photographic elements, particularly when incorporated in hydrophilic colloid layers, such as silver halide emulsion layers. The dyes are particularly useful as sensitizers for radiation-sensitive silver halide emulsions.

Preferred dyes according to the invention for use as sensitizers for radiation-sensitive silver halide emulsions are those of formula I:

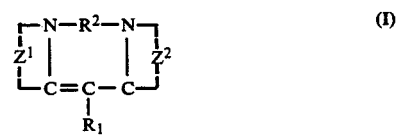

wherein $R^1$ is hydrogen or alkyl of from 1 to 4 carbon atoms which is free of substituents in the α and β positions;

$R^2$ is alkanediyl of from 1 to 5 carbon atoms; and $Z^1$ and $Z^2$ each represent the atoms necessary to complete a benzimidazole cyanine dye nucleus, at least one of $Z^1$ and $Z^2$ including an electron-withdrawing group. $R^1$ can be hydrogen or an alkyl group having up to 4 carbon atoms—i.e., methyl, ethyl, propyl, or butyl groups. The alkyl group is preferably free of α and β substitutions. One or more of the remaining carbon atoms of the alkyl group can be substituted with any of a variety of common dye substituent groups, such as halo, cyano, alkoxy, or alkylthio, where the alkyl moieties contain from 1 to 4 carbon atoms. Preferred alkyl groups are methyl and ethyl. Unsubstituted n-propyl and n-butyl groups are preferred where the alkyl group contains 3 or 4 carbon atoms.

$R^2$ can be any conventional alkanediyl (alkylene) bridging group for benzimidazolo monomethine cyanine dyes. For relative orientations of the benzimidazolo nuclei most efficient for sensitization of silver halide grains, it is preferred that the alkanediyl bridging group provide a bridge of from 1 to 3 carbon atoms linking the N,N' ring positions of the benzimidazolo nuclei. 1,1-Methanediyl, 1,2-ethanediyl, and 1,3-propanediyl bridging groups are exemplary of those specifically contemplated. The alkanediyl bridging groups can be substituted to the extent compatible with forming the desired N,N' bridge of the nuclei, and such substituents can, in general, be selected from known quaternizing benzimidazolo cyanine dye substituents, discussed below. It is specifically contemplated that the alkanediyl bridging group can be substituted with a polar substituent known to enhance the solubilization of cyanine dye in hydrophilic media, such as a hydroxy, carboxy, or sulfonyl substituent. In this respect the dyes of the present invention offer significant advantages over the dyes of Brooker, cited above. Note that the incorporated polar substituent can also serve as a counter ion for the quaternized ring nitrogen atom of the dye.

The electron-withdrawing group or groups attached to one or both of the benzimidazolo nuclei of the dye can be any of the art recognized electron-withdrawing groups for benzimidazolo cyanine sensitizing dye nuclei. The electron-withdrawing groups can occupy any one or combination of the substituent positions of the fused benzo rings of the benzimidazolo nuclei. Generally the 5, 5', 6, and 6' ring positions of benzimidazolo cyanines are preferred positions for electron-withdrawing substituents, both from the viewpoint of synthesis and effectiveness. Electron-withdrawing substituents, such as halo (i.e., chloro, fluoro, bromo, or iodo), cyano, haloalkyl, alkoxycarbonyl, and acyl (e.g., carboxy or sulfo) substituents, are specifically contemplated, with chloro, fluoro, bromo, cyano, and trifluoromethyl substituents being generally preferred for negative-working emulsions. It is recognized that the presence of a second fused benzo ring in the benzimidazolo nucleus can perform an electron withdrawing function, and therefore β-naphthimidazolo nuclei are specifically contemplated to be embraced by $Z^1$ and $Z^2$. The β-naphthimidazolo nuclei can, but need not, be substituted with electron-withdrawing groups, as described above.

Benzimidazolo cyanine dyes have quaternizing substituents. The dyes of the present invention can include any conventional benzimidazolo cyanine dye quaternizing substituent. Alkyl substituents, such as disclosed by Brooker U.S. Pat. No. 2,479,152, are specifically contemplated, but the invention further extends to substituted alkyl substituents which are incompatible with the method described by Brooker for preparing N,N'-alkanediyl bridged benzimidazolo monomethine cyanine dyes. Quaternizing substituents can additionally be chosen from among hydroxyalkyl, alkoxyalkyl, carboxyalkyl, sulfoalkyl, sulfatoalkyl, alkanoylalkyl, alkoxycarbonylalkyl, aralkyl (e.g., benzyl and phenethyl), alkenyl, aryl (e.g., phenyl and naphthyl), or aralkyl (e.g., phenylalkyl and naphthylalkyl) substituents, such as those disclosed by Fumia and Brooker U.S. Pat. No. 3,623,881, here incorporated by reference. Preferred quaternizing substituents contain from 1 to 4 carbon atoms and further include a polar substituent to facilitate introduction into hydrophilic media, such as a gelatino-silver halide emulsion. Preferred polar substituents are acyl substituents (e.g., carboxy and sulfo substituents).

The N,N'-alkanediyl bridged benzimidazolo monomethine cyanine dyes of the present invention can be synthesized by reacting an electron-withdrawing group substituted 1-amino-2-nitrobenzene with 2-$R^1$-propanedioyl dihalide, wherein $R^1$ is as defined above, to produce the correspondingly electron-withdrawing group substituted bis(2-nitrophenyl)-2-$R^1$-propanediamide. The nitro groups are then reduced to primary amine groups with an appropriate reducing agent, such as stannous chloride. In the presence of an acid the primary amine hydrogen and the oxo group of the carbonyl can be eliminated as water, resulting in formation of the electron-withdrawing group substituted benzimidazolo nuclei linked by -$CR^1$- at the 2,2'-ring positions. Subsequently the electron-withdrawing group substituted 2,2'-methanediylbis(benzimidazole) can be sequentially provided with N,N'-alkanediyl bridging and quaternizing substituents in either order of addition. If the quaternizing substituent includes reactive sites, the N,N'-alkanediyl bridging group is first added to the benzimidazolo nuclei. When the quaternizing substituents are added before the N,N'-alkanediyl bridging group, quaternization of the benzimidazolo nuclei does not occur until after the N,N'-alkanediyl bridging group is added. Reduction of the methanediyl (-$CR^1$-) group providing the 2,2'-linkage of the benzimidazolo nuclei to the corresponding methine completes the synthesis of the dye. The N,N'-alkanediyl bridging group can be introduced by reacting the electron-withdrawing group substituted 2,2'-methanediylbis(benzimidazole) with alkanediylbis(p-toluene sulfonate). Similarly, quaternizing substitution can be achieved by employing the p-toluene sulfonate (hereafter also referred to as pts) of the quaternizing group as a reactant. A base can be employed to reduce the methanediyl (-$CR^1$-) group linking the benzimidazolo nuclei to the corresponding methine. It is possible to alkylate the methine linking group with an alkyl p-toluene sulfonate in the presence of base.

A preferred reaction sequence can be diagrammatically represented as follows:

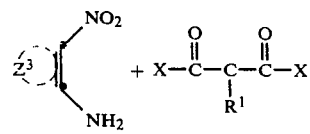

-continued

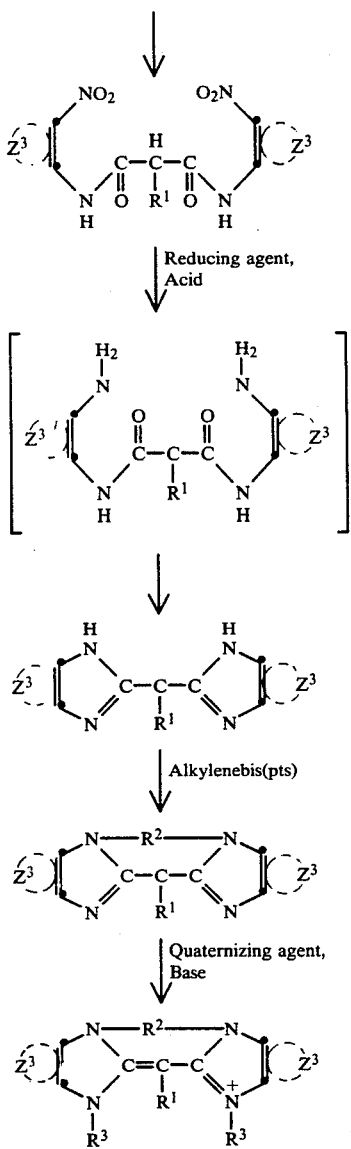

where
X represents a halo atom;
$Z^3$ represents the atoms completing a benzene nucleus including an electron-withdrawing group;
$R^1$ and $R^2$ are as previously defined;
$R^3$ is a quaternizing substituent; and
A is a charge balancing counter ion, which is present when internal ionic charges are otherwise (i.e., in its absence) unbalanced.

In the foregoing description of dye synthesis symmetrical dyes are produced. It is appreciated, however, that unsymmetrical dyes can be alternatively produced. Instead of employing a 2-$R^1$-propanedioyl dihalide, as described, one of the reactive sites can be blocked, as by forming the corresponding half-ester. The one remaining halo group reacts with the 1-amino-2-nitrobenzene. Thereafter the ester linkage can be removed and a halogen substituted. Reaction of the resulting compound with a second, differing 1-amino-2-nitrobenzene, with or without an electron-withdrawing group, produces an unsymmetrical compound which can be converted to a corresponding unsymmetrical dye. The resulting structure is shown below as formula VII:

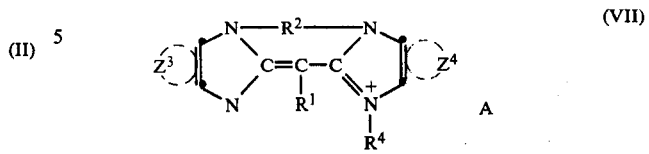

wherein $R^1$, $R^2$, $R^3$, and A are as described above; $Z^3$ and $Z^4$ each represents the atoms completing a benzene nucleus; at least one $Z^3$ and $Z^4$ includes at least one electron-withdrawing group; and $R^4$ is a quaternizing group.

Although preparation of the electron-withdrawing group substituted alkanediyl bridged benzimidazolo monomethine cyanine dyes of the present invention has been described in general terms, identification of specific conditions for synthesis can be readily ascertained by routine procedures. The examples below illustrate preferred synthetic procedures.

Illustrative specific electron-withdrawing group substituted akanediyl bridged benzimidazolo monomethine cyanine dyes according to the present invention are set forth below in Table I.

TABLE I

| | |
|---|---|
| D-1 | 5,5',6,6'-Tetrachloro-1,1'-diethyl-3,3'-ethanediylbenzimidazolocyanine iodide |
| D-2 | 5,5',6,6'-Tetrachloro-1,1'-ethanediyl-3,3'-dimethylbenzimidazolocyanine iodide |
| D-3 | 5,5',6,6'-Tetrabromo-1,1'-diethyl-3,3'-ethanediylbenzimidazolocyanine iodide |
| D-4 | 5,5'-Dicyano-1,1'-diethyl-3,3'-ethanediylbenzimidazolocyanine iodide |
| D-5 | 1,1'-Ethanediyl-5,5',6,6'-tetraiodo-3,3'-dimethylbenzimidazolocyanine iodide |
| D-6 | 5,5',6,6'-Tetra(trifluoromethyl)-1,1'-ethanediyl-3,3'-dimethylbenzimidazolocyanine p-toluene sulfonate |
| D-7 | Anhydro-5,5',6,6'-tetrachloro-1,1'-ethanediyl-3,3'-bis(3-sulfopropyl)benzimidazolocyanine hydroxide, sodium salt |
| D-8 | 5,5',6,6'-Tetrachloro-1,1'-dimethyl-3,3'-propanediylbenzimidazolocyanine p-toluene sulfonate |
| D-9 | 5,5',6,6'-Tetrachloro-1,1'-dimethyl-3,3'-methanediylbenzimidazolocyanine iodide |
| D-10 | 5,5',6,6'-Tetrachloro-1,1'-ethanediyl-3,3'-bis-(2,2,2-trifluoroethyl)benzimidazolocyanine p-toluene sulfonate |
| D-11 | 5,5',6,6'-Tetrachloro-1,1'-ethanediyl-3,3',8-trimethylbenzimidazolocyanine p-toluene sulfonate |
| D-12 | 5,5',6,6'-Tetrachloro-1,1'-ethanediyl-8-ethyl-3,3'-dimethylbenzimidazolocyanine iodide |
| D-13 | 8-(n-Propyl)-5,5',6,6'-tetrachloro-1,1'-ethanediyl-3,3'-(n-propyl)benzimidazolocyanine iodide |
| D-14 | 1',1'-Ethanediyl-3,3'-bis(3-sulfopropyl)-[2,3-d]-naphthimidazolocyanine p-toluene sulfonate |

The electron-withdrawing group substituted alkanediyl bridged benzimidazolo monomethine cyanine dyes of the present invention are specifically contemplated for use in radiation-sensitive silver halide emulsions. The emulsions can be either monodispersed or polydispersed. They can be surface-sensitive, forming predominantly surface latent images, or form latent images predominantly internally. The grains of the emulsions can be of any photographically useful halide composition—e.g., silver chloride and/or silver bromide, optionally additionally including minor amounts of silver iodide. Negative-working silver bromoiodide emulsions are specifically preferred for preparing camera speed photographic elements. Since silver chloride possess low native blue sensitivity, the blue dyes of the present invention can be particularly advantageous when employed in silver chloride containing radiation-sensitive emulsions. It is specifically contemplated to employ dyes according to the present invention in high aspect ratio tabular grain emulsions, such as those described in Kofron et al U.S. Ser. No. 320,904, filed Nov. 12, 1981, titled SENSITIZED HIGH ASPECT RATIO SILVER HALIDE EMULSIONS AND PHOTOGRAPHIC ELEMENTS, now abandoned in favor of U.S. Ser. No. 429,407, filed Sept. 30, 1982, now U.S. Pat. No. 4,439,520. Emulsions useful in the practice of this invention are further described in *Research Disclosure*, Vol. 176, December 1978, Item 17643, Section I Emulsion preparation and types. *Research Disclosure* and its predecessor, *Product Licensing Index*, are both publications of Industrial Opportunities Ltd., Homewell, Havant Hampshire, P09 1EF, United Kingdom.

Any conventional method can be employed for adding the dye to the emulsion. Specific techniques are illustrated by Section XIV Method of addition, Item 17643, cited above. The dyes can be added to the emulsions in conventional amounts. It is known in the photographic art that optimum spectral sensitization is obtained with dye concentrations at about 25 to 100 percent or more of monolayer coverage of the total available surface area of surface sensitive silver halide grains, as disclosed, for example, in West et al, "The Adsorption of Sensitizing Dyes in Photographic Emulsions", *Journal of Phys. Chem.*, Vol. 56, p. 1065, 1952; and Spence et al, "Desensitization of Sensitizing Dyes", *Journal of Physical and Colloid Chemistry*, Vol. 56, No. 6, June 1948, pp. 1090–1103. For silver halide grains forming predominantly internal latent image sites still higher dye concentrations can be employed, as taught by Gilman et al U.S. Pat. No. 3,979,213. Optimum dye concentration levels can be chosen by procedures taught by Mees, *Theory of the Photographic Process*, MacMillan, 1942, pp. 1067–1069.

Although the preferred dyes of the present invention are those which sensitize negative-working emulsions, it is recognized that the presence of strong electron-withdrawing groups, such as nitro groups, can reduce the basicity of the dyes to such a degree that they accept photo-generated electrons. To the extent that the dyes of the present invention are capable of acting as photo-generated electron acceptors they can be used as sensitizers for fogged direct-positive emulsions. Whether a particular dye according to the present invention is best suited for use as a sensitizer with a negative-working emulsion or a fogged direct-positive emulsion can be determined by reference to its oxidation and reduction potentials, as discussed in *Photographic Science and Engineering*, Vol. 18, 1974, pp. 49–52 (Sturmer et al), pp. 175–178 (Leubner) and pp. 475–485 (Gilman). Oxidation and reduction potentials can be measured as described by R. J. Cox, *Photographic Sensitivity*, Academic Press, 1973, Chapter 15.

When the spectral sensitizing dyes are employed in radiation-sensitive emulsions according to this invention, the emulsions can be unwashed or washed, as described in Section II; chemically sensitized as described in Section III; and contain antifoggants, stabilizers, and similar addenda as described in Section VI. The photographic elements according to this invention containing dyes according to the present invention can contain in the dye containing layer or layers or other layers brighteners, as described in Section V; color materials, as described in Section VII; absorbing or scattering materials, as described in Section VIII; vehicles (preferably gelatin or gelatin derivatives) and vehicle extenders, as described in Section IX; hardeners, as described in Section X; coating aids, as described in Section XI; plasticizers and lubricants, as described in Section XII; and matting agents, as described in Section XVI. The radiation-sensitive layer or layers of the photographic elements as well as other layers located beneath, over, or between the radiation-sensitive layers can be coated on any conventional photographic support, such as disclosed in Section XVII, by conventional procedures, such as those disclosed in Section XV. (All sections appear in Item 17643, cited above.)

The photographic elements in which the dyes of the present invention can be employed include conventional black-and-white photographic elements intended to form a viewable silver image. The silver image can be dye enhanced. The photographic elements also include chromogenic photographic elements—that is, elements which form monochromatic dye images. The photographic elements can be radiographic elements intended for use with X-ray absorbing, blue emitting screens. The photographic elements can form multicolor dye images. The invention is particularly applicable to multicolor photographic elements comprised of subtractive primary (yellow, magenta, and cyan) color-forming layer units, wherein one or more yellow dye-forming layer units contain silver halide grains sensitized with a blue absorbing dye according to the present invention. The .hotograpphic elements can be adapted to form transferred and/or retained silver or dye images. The photographic elements can include image transfer film units, as described in Section XXIII.

When the dyes of the present invention are employed as blue sensitizers, the photographic elements in which they are contained are contemplated to be exposed to blue light. The photographic elements can be monochromatically, orthochromatically, or panchromatically exposed, and other forms of radiation can be used in combination for exposure for specialized applications, if desired. Light energy can either take noncoherent (random phase) forms or coherent (in phase) forms, as produced by lasers. Imagewise exposures at ambient, elevated or reduced temperatures and/or pressures, including high or low intensity exposures, continuous or intermittent exposures, exposure times ranging from minutes to relatively short durations in the millisecond to microsecond range and solarizing exposures, can be employed within the useful response ranges determined by conventional sensitometric techniques, as illustrated by T. H. James, *The Theory of the Photographic Process*, 4th Ed., Macmillan, 1977, Chapters 4, 6, 17, 18, and 23.

The photographic elements can be processed by conventional procedures, such as disclosed by Section XIX. If desired addenda can be incorporated in the photographic elements to facilitate processing, such as developing agents or development modifiers, as described in Sections XX and XXI.

Although the dyes of the invention have been particularly disclosed for use in radiation-sensitive silver halide emulsions, they can, of course, be applied to other suitable dye applications. For example, dyes useful as electron trapping sensitizers for fogged direct-positive silver halide emulsions are also generally suitable for use as sensitizers in photoconductors.

The invention can be better appreciated by reference to the following specific examples:

Lettered examples are directed to preparation of dye intermediates. Numbered examples are directed to preparation of the dye as an end product or its use. Abbreviations used are THF=tetrahydrofuran, HOAc=acetic acid (glacial), NaOH=sodium hydroxide, HCl=hydrochloric acid, DMF=dimethylformamide, MeOH=methanol, EtOH=ethyl alcohol and TEA=triethylamine.

EXAMPLE A

Preparation of N,N'-Bis(4,5-dichloro-2-nitrophenyl)propanediamide ($C_{15}H_8Cl_4N_4O_6$; MW=482.07)

1-Amino-4,5-dichloro-2-nitrobenzene (113.84 g, 0.55 moles) was dissolved in THF (500 ml). Malonyl chloride (38.75 g, 0.27 moles) was added to the mixture heated to reflux. Another 500 ml portion of THF was added and refluxing was continued for two hours. HCl evolved during the reaction. The reaction mixture was then chilled in an ice bath, the solid was filtered off, washed with cold THF, and dried. A second yield was obtained by concentrating the filtrate, filtering off the solid, making a slurry of the solid in diethyl ether and filtering again. Yield 166.8 g (88%). Product was used as isolated for the next step in the sequence. Anal. Calcd. for $C_{15}H_8Cl_4N_4O_6$: C, 37.4; H, 1.7; Cl, 29.4; N, 11.6. Found: C, 37.4; H, 1.3; Cl, 29.4; N, 11.6

EXAMPLE B

Preparation of 2,2'-methanediylbis-(5,6-dichlorobenzimidazole)

($C_{15}H_8Cl_4N_4$; MW=386.07)

Stannous chloride-dihydrate, $SnCl_2.2H_2O$ (40.6 g, 0.18 moles), was dissolved in 12N HCl (50 ml). The compound of Example A (9.64 g, 0.02 moles) was added to refluxing HOAc (100 ml) in a 1 liter flask. During the addition the $SnCl_2$ solution in HCl was heated to reflux and it was subsequently added to the refluxing HOAc suspension of A. A very exothermic reaction resulted which nevertheless was easily contained in the flask. Heating was continued as most of A dissolved. After ten minutes a new precipitate appeared. Refluxing was continued for 1½ hours (2 hours total time) and the reaction mixture then cooled. Ice was added followed by enough 50% NaOH to neutralize the reaction mixture and precipitate the product. The product was filtered off, washed with water and dried. Yield 7.34 g (95%). This material was used for the subsequent step in the sequence. It was purified by dissolving the crude solid in dilute aqueous NaOH, filtering off some undissolved solid while hot, and reprecipitating the product by neutralizing the filtrate with HCl. This was filtered off, washed with water, and dried.

EXAMPLE C

Preparation of 1,1'-Ethanediyl-2,2'-methmethanediylbis(5,6-dichlorobenzimidazole)

$C_{17}H_{10}Cl_4N_4$; MW=412.12)

Sodium hydride (NaH) (50% activity) (3.58 g, 0.075 moles) was washed with hexane and suspended in DMF (25 ml). The compound of Example B (12.0 g, 0.31 moles) dissolved in DMF (50 ml) was added slowly to the NaH suspension with stirring (hydrogen was evolved). Stirring was continued for 30 minutes. Ethanediylbis(p-toluene sulfonate) (11.5 g, 0.031 moles) in DMF (50 ml) was added slowly. Stirring was continued at room temperature (20° C.) for 30 minutes and the reaction mixture then was heated to 100° C. and held there for another hour. After cooling the reaction mixture was treated with water (around 150 ml) and made acidic with 4N HCl. The solid was filtered off, washed in water, suspended in refluxing MeOH and filtered again. The product was suspended once more in refluxing acetone, filtered off, and dried. Yield 4.7 g (37%).

EXAMPLE 1

5,5',6,6'-Tetrachloro-1,1'-diethyl-3,3'-ethanediylbenzimidazolocyanine Iodide ($C_{21}H_{19}Cl_4IN_4$; MW=596.12)

The compound of Example C (0.40 g, 0.97 mmoles) was dissolved with heating in ethyl p-toluene sulfonate (10 g). The reaction mixture was heated for 5 minutes, cooled and treated with acetone and up to a liter of diethyl ether to precipitate the dye. After standing overnight the ether was decanted and solid was filtered off, washed with ether, and dried. The solid was redissolved in refluxing EtOH, the resulting solution was filtered to remove some undissolved solid, the filtrate was treated with sodium iodide (0.30 g), and the solution was chilled in an ice bath. A green solid was filtered off and dried. Yield 0.30 g. The sample was purified by dissolving it in a minimum amount of hot pyridine, filtering while hot, and treating the filtrate with EtOH to reprecipitate the dye. Yield 0.15 g (26%). λ-max$_{(MeOH)}$=401 nm. ε-max=12.4×10⁴. ε-max is the extinction coefficient of the dye at the wavelength of maximum light absorption.

EXAMPLE 2

5,5',6,6'-Tetrachloro-1,1'-ethanediyl-3,3'-dimethylbenzimidazolocyanine Iodide ($C_{19}H_{15}Cl_4IN_4$; MW=478.07)

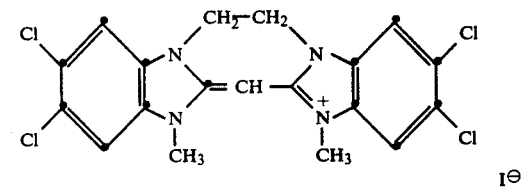

A procedure analogous to that of Example 1 was used, except that methyl p-toluene sulfonate was used in place of the ethyl ester, and TEA was added to the reaction mixture after refluxing before dilution with a fourfold amount of diethyl ether. Yield 21%; λ-max$_{(MeOH)}$=400 nm; ε-max=12.50×10⁴.

EXAMPLE 3

Anhydro-5,5',6,6'-tetrachloro-1,1'-ethanediyl-3,3'-bis(3-sulfopropyl)benzimidazolocyanine Hydroxide, Sodium Salt ($C_{23}H_{21}Cl_4N_4NaO_6S_2$; MW=678.36)

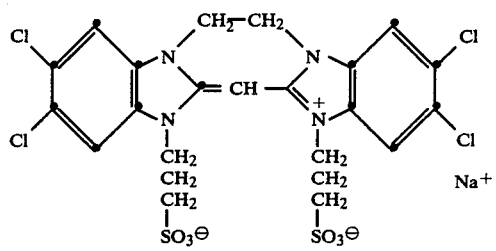

The compound of Example C (1.0 g, 0.0024 moles) and propanesultone (9.6 g) were heated together to reflux over about 7 minutes. The reaction mixture cooled to room temperature over 45 minutes. Acetone was added and the resulting precipitate was filtered off, washed with acetone, and partially dried. The solid was treated with enough MeOH to make a slurry. Excess TEA was added to help it dissolve. The solution was filtered to remove some undissolved solid. The filtrate was treated with 0.60 g sodium acetate in MeOH and stirred overnight. The solid which separated was filtered off, reslurried with MeOH, diluted with toluene, and boiled to remove the MeOH. The solid was filtered off and dried. Yield 0.59 g. Concentration of the filtrate yielded an additional 0.8 g of the solid. Combined Yield 1.39 g; 0.85%. λ-max (MeOH=403 nm. ε-max=9.25×10⁴.

The examples that follow illustrate N,N' alkylation prior to addition of the alkanediyl bridging group.

EXAMPLE D

Preparation of 2,2'-Methanediylbis-(5,6-dichloro-1-methylbenzimidazole)

($C_{17}H_{12}Cl_4N_4$; MW=414.13)

Sodium hydride (NaH) (50% activity) (2.1 g, 0.0435 moles) was washed with hexane and suspended in DMF (25 ml). The compound of Example B (7.0 g, 0.018 moles) dissolved in DMF (50 ml) was added slowly to the NaH suspension with stirring (hydrogen was evolved). Stirring was continued for 50 minutes. Methyl p-toluene sulfonate (6.75 g, 0.036 moles) in DMF (25 ml) was added causing a slightly exothermic reaction at first. The reaction mixture was stirred at room temperature for 2½ hours, then cooled, treated with water (around 150 ml) and made acidic with 4N HCl. The solid was filtered off, washed with water, and dried. Yield 8.4 g. The crude product was refluxed in acetone, filtered, and dried. Yield 5.0 g (67%).

EXAMPLE 4

5,5',6,6'-Tetrachloro-1,1'-dimethyl-3,3'-propanediyl-benzimidazolocyanine p-Toluene sulfonate ($C_{27}H_{24}Cl_4N_4O_3S$; MW=626.39)

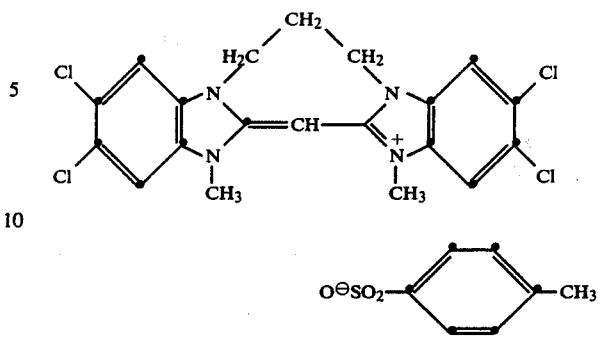

The compound of Example D (1.21 g, 2.92 millimoles) was mixed with trimethylenebis(p-toluene sulfonate) (1.12 g, 2.92 millimoles) and heated strongly with good stirring for 2 minutes. After cooling the dark glassy solid was stirred with MeOH containing TEA and refluxed for 5 minutes. The hot slurry was filtered and the filtrate chilled in ice to precipitate the solid which was filtered off, washed with a little MeOH and dried. Yield 0.32 g (17%); λ-max(MeOH)=403 nm; ε-max=12.0×10⁴.

EXAMPLE 5

5,5',6,6'-Tetrachloro-1,1'-dimethyl-3,3'-methanediyl-benzimidazolocyanine Iodide ($C_{18}H_{13}Cl_4IN_4$; MW=554.04)

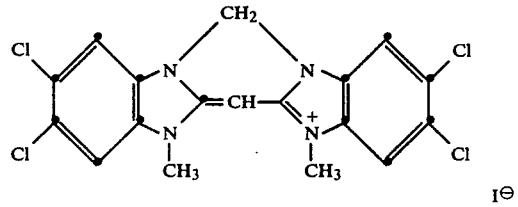

The compound of Example D (1.0 g, 2.5 mmoles) was heated at reflux with diiodomethane (25 g) for 25 minutes. After cooling, it was diluted with dichloromethane, and filtered, and the solid was washed with dichloromethane. The solid was refluxed in MeOH and filtered while hot to yield 0.98 g of solid. This was dissolved with heating in methyl p-toluene sulfonate (10 ml) and reprecipitated by the addition of MeOH and diethyl ether. The solid was once more refluxed in MeOH, filtered, and dried. Yield 0.22 g (13%); λ-max=403 nm; ε-max=7.09×10⁴.

A further example of a dye prepared by my procedure is that of Example 6. Examples E and F relate to intermediates for this dye.

EXAMPLE E

Preparation of 2,2,2-Trifluoroethyl Trifluoromethylsulfonate ($C_3H_2F_6O_3S$; MW=232.10)
$CF_3CH_2O-SO_2-CF_3$ Trifluoromethane sulfonic anhydride 74.4 g, 48 ml (0.3 mole) was added cautiously, with external cooling as necessary, to 30 g, 21.6 ml (0.3 mole) of 2,2,2-trifluoroethanol (dried over molecular sieves). After the spontaneous exothermic reaction had ceased the reaction mixture was refluxed for 3–4 minutes then carefully and slowly distilled at atmospheric pressure:

| Discarded Forerun | b.p. 87–92° | 7 g |
|---|---|---|
| Product | b.p. 92–93° | 33.2 g, 47.7% |

The product may be redistilled to remove the last trace of trifluoromethanesulfonic acid.

EXAMPLE F

Preparation of
2,2'-Methanediylbis[5,6-dichloro-2-(2,2,2-trifluoroethyl)benzimidazole]

($C_{19}H_{10}Cl_4F_6N_4$; MW = 550.13)

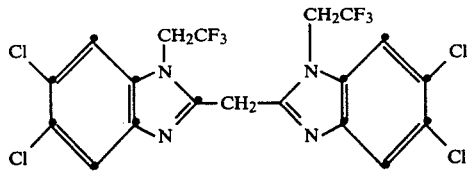

Sodium hydride (57% activity) (2.31 g, 0.055 moles) was washed with hexane under nitrogen and suspended in DMF (40 ml). The compound of Example B (9.67 g, 0.025 moles) was added and the mixture was chilled in an ice bath. The compound of Example E was added slowly with stirring. Stirring was continued for one hour. The bath then warmed to 90° C., and stirring was continued for another hour. After cooling to room temperature (20° C.), the reaction mixture was filtered and the filtrate was allowed to stand for three days. The filtrate was treated with water (100 ml) and stirred to break up lumps, and the solid was filtered off and air dried overnight. The solid was dissolved in MeOH (125 ml), filtered through a crushed stone (Celite trademark) pad to remove some fine insoluble material. The filtrate was cooled overnight (15 hours), and the solid was filtered off. Yield 3.3 g. A second yield of 1.2 g was obtained by concentrating filtrate to 25 ml. Total yield 4.5 g (33%). The two yields were combined and recrystallized from MeOH (150 moles) containing charcoal. m.p. 235°–237° C. (phase transition at 130° C.)

EXAMPLE 6

5,5',6,6'-Tetrachloro-1,1'-ethanediyl-3,3'-bis(2,2,2-trifluoroethyl)benzimidazolocyanine p-Toluene sulfonate ($C_{28}H_{20}Cl_4F_6N_4O_3S$; MW = 748.37)

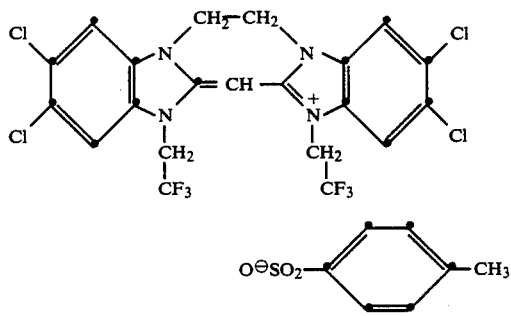

The compound of Example F (0.25 g 0.455 millimoles) was mixed with ethylene bis(p-toluene sulfonate) (2 g) and heated strongly with stirring for 5 minutes.

After cooling methylene chloride was added and the mixture was filtered. The solid was recrystallized from EtOH (20 ml). Yield 0.09 g (26%); λ-max(MeOH) = 400 nm; ε-max = $12.0 \times 10^4$.

EXAMPLE 7

5,5',6,6'-Tetrachloro-1,1'-ethanediyl-3,3'-8-trimethyl-benzimidazolocyanine p-Toluene sulfonate ($C_{27}H_{24}Cl_4IN_4O_3S$; MW = 626.39)

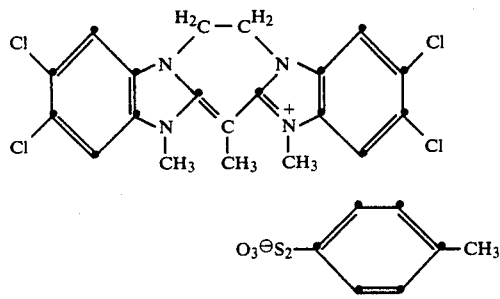

This dye was isolated as a by-product of the reaction by which the dye of Example 2 was formed.

EXAMPLE 8

The dye of Example 7 was tested in a 0.2 μm sulfur and gold sensitized, monodispersed gelatino-silver bromoiodide emulsion containing 2.5 mole % iodide. The dye was added to the emulsion at the concentration indicated below and the resulting mixture was coated to obtain a silver coverage of 0.07 g/m² on a cellulose acetate support. A sample of the coating was exposed in a spectral sensitometer to a quartz-halogen light source through a Wratten 80B ® color-correcting filter, diffraction grating with filters to remove second order transmission, and superimposed step wedge. The coating sample was developed in a Kodak Versamat ® roller transport processor for 80 sec at 23° C. in an N-methylaminophenol sulfate-hydroquinone developer, fixed, washed, and dried. A characteristic (density vs log exposure) curve was determined for the coating at 400 nm and at each 10 nm interval between 400 nm and 700 nm. The speed at 0.3 density units above fog was read from each characteristic curve, adjusted for a uniform energy distribution over the spectral range, and plotted against wavelength to obtain a relative log spectral sensitivity curve. The sensitizing maximum and the relative speed at the sensitizing maximum for each emulsion was determined from this curve. The results are tabulated below.

| | Level Mole/Ag Mole | Relative 400 nm Speed | Sensitizing Max (nm) | Sensitizing Range (nm) |
|---|---|---|---|---|
| Undyed Control | — | 100 | — | to 490 |
| Ex. 7 | $8.0 \times 10^{-4}$ | 136 | 450 | to 490 |

The dye of Example 7 sensitized very strongly at 450 nm.

The invention has been described in detail with particular reference to preferred embodiments thereof, but it will be understood that variations and modifications can be effected within the spirit and scope of the invention.

I claim:
1. A radiation-sensitive emulsion comprised of
a dispersing medium,
silver halide grains, and
a sensitizing amount of N,N'-alkanediyl bridged benzimidazolo monomethine cyanine dye wherein at least one of the benzimidazolo nuclei are substituted with an electron-withdrawing group.
2. A radiation-sensitive emulsion comprised of
a dispersing medium,
silver halide grains, and
a sensitizing amount of a dye of the formula

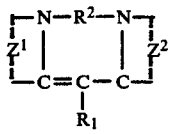

wherein
$R^1$ is hydrogen or alkyl of from 1 to 4 carbon atoms which is free of substituents in the $\alpha$ and $\beta$ positions;
$R^2$ is alkanediyl of from 1 to 5 carbon atoms; and
$Z^1$ and $Z^2$ each independently represents the atoms necessary to complete a benzimidazole cyanine dye nucleus, at least one of $Z^1$ and $Z^2$ including an electron-withdrawing group.
3. A radiation-sensitive emulsion according to claim 2 wherein $R^2$ is alkanediyl of from 1 to 3 carbon atoms.
4. A radiation-sensitive emulsion according to claim 3 wherein $R^1$ is hydrogen, methyl, or ethyl.
5. A radiation-sensitive emulsion according to claim 4 wherein said cyanine dye includes at least one acyl-substituted alkyl quaternizing substituent.
6. A radiation-sensitive emulsion according to claim 2 wherein said electron-withdrawing group is a halo, cyano, nitro, haloalkyl, alkoxycarbonyl, or acyl group.
7. A radiation-sensitive negative-working emulsion comprised of
a hydrophilic dispersing medium,
silver halide grains, and
a sensitizing amount of a blue absorbing dye of the formula

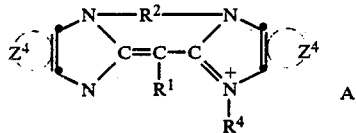

wherein
$R^1$ is hydrogen, methyl, or ethyl;
$R^2$ is alkanediyl of from 1 to 3 carbon atoms;
$R^3$ and $R^4$ each independently represents an alkyl or acyl-substituted alkyl quaternizing substituent of from 1 to 4 carbon atoms;
$Z^3$ and $Z^4$ each independently represents the atoms completing a benzene nucleus, at least one of $Z^3$ and $Z^4$ including an electron-withdrawing group chosen from among chloro, fluoro, bromo, cyano, and trifluoromethyl; and
A is a charge balancing counter ion present when internal ionic charges are otherwise unbalanced.
8. A radiation-sensitive negative-working emulsion according to claim 7 wherein said blue absorbing dye is symmetrical.
9. A photographic element comprised of
a support and, coated on said support,
a silver halide emulsion according to any one of claims 1 through 8.
10. A multicolor photographic element comprised of
a support and, coated on said support,
yellow, magenta, and cyan color-forming layer units, said yellow color-forming layer unit being comprised of an emulsion according to claim 7.
11. A multicolor photographic element according to claim 10 in which said blue absorbing dye is a 5,5',6,6'-tetrahalo-1,1'-di(alkayl or acyl-substituted alkyl)-3,3'-alkanediylbensimidazolocyanine dye.

* * * * *